(12) United States Patent
Karem et al.

(10) Patent No.: US 9,871,979 B2
(45) Date of Patent: Jan. 16, 2018

(54) SYSTEMS AND METHODS FOR ILLUMINATION AND OBSERVATION

(71) Applicant: Karem Aircraft, Inc., Lake Forest, CA (US)

(72) Inventors: Abe Karem, Tustin, CA (US); Benjamin Tigner, Laguna Beach, CA (US)

(73) Assignee: KAREM AIRCRAFT, INC., Lake Forrest, CA (US)

( * ) Notice: Subject to any disclaimer, the term of this patent is extended or adjusted under 35 U.S.C. 154(b) by 620 days.

(21) Appl. No.: 13/776,444

(22) Filed: Feb. 25, 2013

(65) Prior Publication Data
US 2015/0358556 A1    Dec. 10, 2015

Related U.S. Application Data

(60) Provisional application No. 61/602,736, filed on Feb. 24, 2012.

(51) Int. Cl.
| | |
|---|---|
| *H04N 5/30* | (2006.01) |
| *H04N 5/225* | (2006.01) |
| *B64C 39/02* | (2006.01) |
| *B64D 47/08* | (2006.01) |

(52) U.S. Cl.
CPC .............. *H04N 5/30* (2013.01); *H04N 5/225* (2013.01); *B64C 39/02* (2013.01); *B64C 2201/00* (2013.01); *B64C 2201/127* (2013.01); *B64D 47/08* (2013.01)

(58) Field of Classification Search
CPC ............... B64C 39/02; B64C 2201/00; B64C 2201/127; B64C 2201/027; B64D 47/08; H04N 5/225; H04N 5/30
See application file for complete search history.

(56) References Cited

U.S. PATENT DOCUMENTS

| | | | |
|---|---|---|---|
| 6,211,951 B1 * | 4/2001 | Guch, Jr. ................ | F41G 3/326 356/141.3 |
| 6,445,351 B1 * | 9/2002 | Baker ...................... | H01Q 1/22 343/725 |

(Continued)

*Primary Examiner* — Christopher S Kelley
*Assistant Examiner* — Maria Vazquez Colon
(74) *Attorney, Agent, or Firm* — Robert D. Fish; Fish IP Law, LLC

(57) ABSTRACT

An aerial surveillance and reconnaissance system includes a gimbal-stabilized ISR imaging sensor with 0.8-1.2 microradian optical resolution, using pulsed ultraviolet laser (0.330-0.380 micrometer wavelength) radiation to illuminate the observed target, and a narrow-band-pass filter at the focal plane detector to remove light at frequencies other than the illuminating frequency. Preferred sensors can be operated in a snapshot mode using intermittent illuminating pulses, with timing of the pulses selected for minimum detectability based on observations made with a lower-resolution sensor, or in a video-mode with illuminating pulses selected to generate full-motion video at operator-selectable frame rates. Some sensor embodiments may further combine the UV system described above with conventional daylight optical and sensor systems, though alternative arrangements could also include an IR sensor as well (either using a common aperture with the UV system or with a separate set of light-gathering optics).

8 Claims, 3 Drawing Sheets

(56) References Cited

U.S. PATENT DOCUMENTS

| | | | | |
|---|---|---|---|---|
| 2003/0042303 A1* | 3/2003 | Tsikos | ............... | G06K 7/10594 |
| | | | | 235/384 |
| 2007/0058164 A1* | 3/2007 | Shibata | ........... | G01N 21/95607 |
| | | | | 356/237.2 |
| 2010/0141503 A1* | 6/2010 | Baumatz | .................. | G01S 7/48 |
| | | | | 342/27 |
| 2011/0309248 A1* | 12/2011 | Thoma | ................. | G01J 1/0407 |
| | | | | 250/339.06 |

* cited by examiner

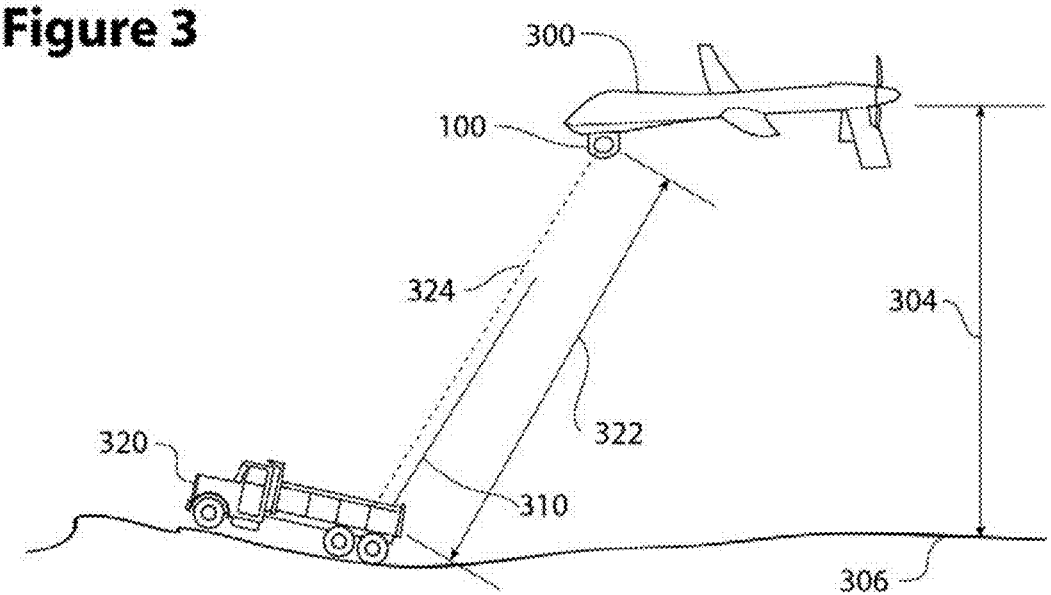

SYSTEMS AND METHODS FOR ILLUMINATION AND OBSERVATION

This application claims priority to U.S. provisional application Ser. No. 61/602,736 filed Feb. 24, 2012.

FIELD OF THE INVENTION

The field of the invention is generally related to apparatus and methods for illumination, observation, surveillance, and tracking of objects from a remote platform, especially aerial platforms.

BACKGROUND

Intelligence, Surveillance, and Reconnaissance (ISR) is a practice that assists a force in employing sensors to gather data, then managing or processing that data to produce information. ISR is most commonly employed by military forces, and is often leveraged to improve a commander's situational awareness and consequently their decision making. Apparatus and methods for ISR are essential to such processes. And object of ISR is often to detect, identify, or track a target.

Imaging sensors for ISR in the prior art tend to use focusing elements to direct electromagnetic radiation coming from a target of observation onto an image sensor located at or near the device's focal plane. Some prior art systems exist which use radiation across a wide range of the electromagnetic spectrum, from microwave radio (radar) up through infra-red and visible light (electro-optical and infra-red, or EO-IR).

Some gimbaled prior art systems for ISR exist that can be mounted on an aerial platform and can carry multiple sensors on the same gimbal. These prior art systems tend to be either only daylight capable or are electro-optical and infrared.

Prior art systems can be categorized by the source of the electromagnetic radiation used to detect a target, selected from a list consisting of: natural illumination, self-illumination, and artificial illumination.

Natural illumination systems use sun-light, moon-light, star-light, or man-made radiation sources not resulting from any action of a remote observing platform to illuminate a target object. Natural illumination typically carries significant energy in the visible part of the spectrum, with electromagnetic wavelengths between 0.390 and 0.750 micrometers.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The blackbody radiation emitted by objects at or near room temperature is often sufficiently intense to be detected by an ISR system; such systems are referred to as self-illumination systems. Self-illumination results in radiation predominantly in the infrared region of the spectrum, with wavelengths in the range of 3-5 micrometers. Self-illumination of room-temperature objects produces such small amounts of energy in the visible and shorter wavelengths as to be unobservable by practical sensors.

Artificial illumination systems comprise components that generate illuminating radiation and direct this illumination at a target for the purpose of reflecting radiation to generate an image on a sensor or receptor. Common examples of artificial illumination systems include ordinary flash camera which fires the flash bulb to illuminate a target object in the resulting photograph captured by the camera sensor. Artificial illumination is generally considered undesirable in ISR applications because the illuminating energy radiated from the ISR apparatus can be detected.

A relevant physical law for remote optical systems is known as the diffraction limit of resolution. The angular resolution of an imaging device is defined by the size of detail that can be distinguished by the device. Fundamental physics involving the diffraction of electromagnetic radiation puts limits the angular resolution that can be achieved, and can be expressed by the equation:

$$\sin(\theta) = 1.220 \, \lambda/D$$

where $\theta$ represents the angular resolution in radians, $\lambda$ represents the wavelength of the radiation in meters, and $D$ represents the diameter of the sensors receiving aperture in meters. This relationship limits the practical usage of prior art ISR systems, forcing systems which require high resolution for target identification to operate close to the target. Such prior art systems may also have to operate in the daytime in order to capitalize on the present natural illumination.

It is well known that natural solar illumination contains significant energy content in wavelengths spanning from approximately 0.1 micrometers to 10 micrometers. Wavelengths greater 0.390 micrometers comprise the visible and infrared spectra, and are used extensively by a variety of prior art ISR sensors, but these sensors suffer from the wavelength-based fundamental limits on angular resolution imposed by the diffraction limit of resolution.

Thus, in ISR applications there is a need to detect, observe, identify, confirm, and track targets, in all conditions, both day and night, often from remote and aerial platforms. Further, there is a need for such systems to have a low probability of detection, to be compact and portable by aerial platforms, to function from great distances, to use methods enabling both target detection and target identification with minimal operator interaction. This combination of needs has not been met by the known prior art.

SUMMARY OF THE INVENTION

The inventive subject matter provides apparatus, systems and methods in which a gimbal-stabilized ISR imaging sensor with 0.8-1.2 microradian optical resolution, using pulsed ultraviolet laser (0.330-0.380 micrometer wavelength) radiation to illuminate the observed target, and a narrow-band-pass filter at the focal plane detector to remove light at frequencies other than the illuminating frequency. In preferred embodiments, the same high-resolution UV sensor works substantially identically during either day or at night conditions, since the UV sensor performance is largely independent of solar illumination. Preferred sensors can be operated in a snapshot mode using intermittent illuminating pulses, with timing of the pulses selected for minimum detectability based on observations made with a lower-resolution sensor, or in a video-mode with illuminating pulses selected to generate full-motion video at operator-selectable frame rates.

Some preferred sensor embodiments may further combine the UV system described above with conventional daylight optical and sensor system, though alternative arrangements could also include an IR sensor as well (either using a common aperture with the UV system or with a separate set of light-gathering optics). When not combined with ordinary day-light and/or IR sensors, the proposed system would normally be used in conjunction with another sensor that provides these functions for situational awareness and target cueing. Some second electro-optical systems may be selected to have a lower optical resolution than the primary optical system and may also have a wider minimum field of view and a smaller aperture. Preferred secondary systems may be mounted on the same gimbal as the primary system. In some contemplated implementations, the second system may function in a wide field-of-view target detection role, while the primary system acts as a narrow field of view target identification and confirmation role.

In preferred systems, the wavelength of light used for illumination is advantageously selected to be in the range of 0.330-0.380 micrometer wavelength, or more preferably in the range of 0.350-0.360 micrometer wavelength. Shorter wavelengths may have increased atmospheric attenuation, especially in urban areas where pollution affects air quality, while wavelengths longer than 0.380 micrometers may be too easily detected from the target location.

In contrast to prior art gimbal-stabilized ISR imaging systems installed on aircraft and other aerial platforms, preferred systems provide a common sensor for both day and night observation than can reduce system complexity, cost, and operational logistics. With the present system, ultraviolet light can be used for imaging during the day from a remote platform. Further, it is contemplated that the short-wavelength ultraviolet light used by preferred systems gives a higher resolution per aperture size than visible or infrared sensors, which can enable smaller system packaging and a lower cost for a given resolution requirement. Still further, it is contemplated that short-duration, high-intensity pulse and narrow-band filtering on receiver can advantageously provide noise rejection and reduced motion blur, lowering the performance requirements of the stabilizing gimbal. In preferred systems, the duration of an illuminating pulse is advantageously selected to be shorter than the light round-trip transit time, so the system can use a single set of common optics for both control of the illumination beam and focusing the returned image. This can enable a smaller size and lower cost of an ISR system for a given resolution. Finally, because the UV radiation employed by preferred systems is undetectable by the human eye and most commonly-available electronic cameras, targets can be illuminated covertly and without a low probability of detection.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3 is a schematic illustration of a surveillance and reconnaissance system employed on an unmanned aircraft

DETAILED DESCRIPTION OF THE INVENTION

Figure 1:
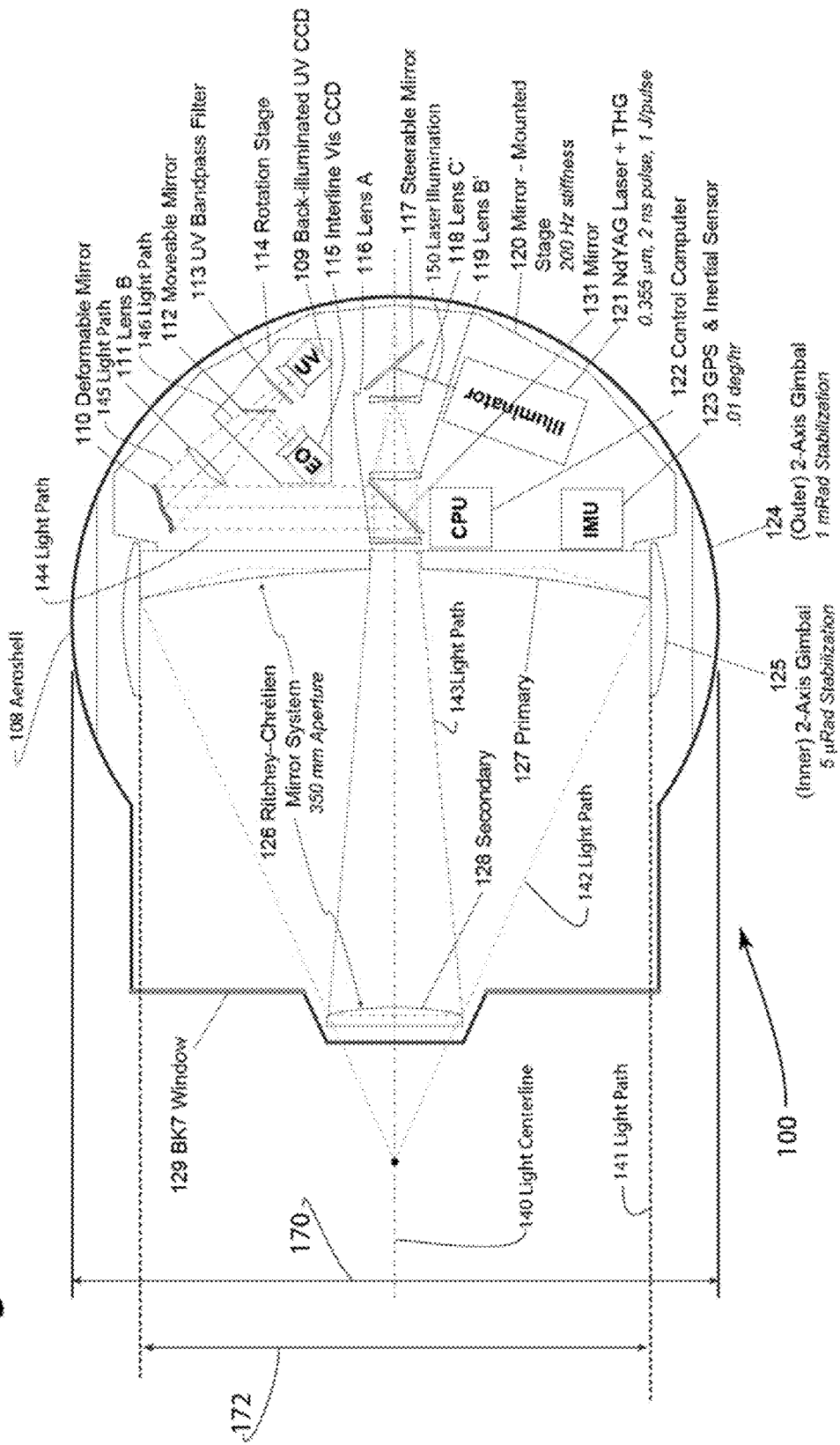
FIG. 1 is a schematic illustration of a preferred surveillance and reconnaissance system.

The diffraction limit of resolution indicates that for a given required angular resolution, the size of the sensor aperture required is directly proportional to the wavelength of the light. Since smaller apertures are desirable for logistics and cost reasons, systems that use the shortest possible wavelength will be preferred. Novel systems and methods for using very short wavelengths in ISR systems are described.

Solar radiation in the ultraviolet range (wavelengths less than 0.390 micrometers) is mostly filtered out by atmospheric absorption, and very little solar energy in this range reaches the ground. But ultraviolet absorption is primarily due to ozone (O3) found in the upper atmosphere above altitudes of about 40,000 feet. Below about 40,000 feet in altitude, the atmosphere is essentially transparent to ultraviolet radiation longer than 0.350 micrometers.

Because of this, and also the fact that human sight is insensitive to wavelengths below about 0.390 micrometers, the inventors have advantageously recognized that the ultraviolet range from 0.350 to 0.390 micrometers provides a useful window for high-resolution ISR illumination and observation, because this illumination is essentially invisible to human eyesight. One preferred method for ultraviolet illumination uses an Nd:YAG (neodymium-doped yttrium aluminum garnet) pulsed laser coupled with a third-harmonic generator, producing pulse durations of 0.8-3.0 nanoseconds or even 1-2 nanoseconds, at 0.350-0.360 micrometers wavelength. The intensity of illumination required depends on the amount of energy needed by the focal-plane detector to capture an image, as well as the geometric and physical factors that govern the fraction of illumination energy that returns to the detector. One implementation results in $5 \times 10^{-16}$ of the illumination pulse being returned per pixel of focal-plane detector. For illumination energy of 1.0 Joules per pulse at 0.355 micrometers wavelength, this arrangement will return about 1,000 photons to each detector pixel.

The illumination pulse travels at the speed of light on its way to the target, as does the return pulse reflected back toward the sensor. Therefore, the time between when a pulse leaves the illuminator and when its reflection returns to the detector depends on the range to the target, increasing linearly at 10.7 microseconds for every mile of range. Since the energy content of the illuminating pulse is vastly higher than the energy of the returned reflection, the sensitive focal-plane detector must be protected from direct exposure to the illumination pulse, or from any light reflected by dust or objects in the near vicinity of the detector. This protection can be best accomplished through time-based filtering by opening an acceptance shutter to the focal plane detector after the outgoing illumination pulse has travelled away from the vicinity of the sensor.

Another result of the brief duration of the illumination pulse is to minimize blurring of the image due to either motion of the target during the time it is reflecting the pulse or due to motion of the optics and focal plane detector during image reception Throughout the following discussion, numerous references will be made regarding computers, processing systems or other systems formed from computing devices. It should be appreciated that the use of such terms is deemed to represent one or more computing devices having at least one processor configured to execute software instructions stored on a computer readable media.

FIG. 1 is a schematic illustration of a preferred ISR system 100 according to the present inventive subject matter.

Light (here used to describe electromagnetic radiation with wavelengths both in and out of the visible spectrum) enters following a light centerline 140. The light path 141 enters through an entry window 129 of BK7 glass. The light encounters a Ritchey-Chrétien system 126 with a primary element 127 and a secondary element 128. The light path 141 converges to light path 142 after striking the primary element 127 and converges again to light path 143 after striking secondary element 128. The aeroshell 108 also has a diameter 170, which is greater than the aperture 172.

The primary aperture is protected by a diameter entry window 129 advantageously made of BK7 glass or other suitable material and having an aperture 172 between 300 and 600 mm, 400 and 500 mm, or between 430 and 460 mm. BK7 glass has desirable optical properties at wavelengths of 0.355 micrometers and throughout the visible spectrum, as well as suitable mechanical properties. Alternative embodiments are contemplated that incorporate both UV and IR sensors and may use other window and lens materials, possibly including VUV-grade sapphire.

The primary 127 and secondary 128 mirrors form a Ritchey-Chrétien telescope 126 with between 400 and 500 mm, or between 430 and 460 mm. The mirrors 127, 128 are precision ground in matching hyperbolic shapes designed to eliminate optical errors both on—and off—the optic axis.

The precision optical components are protected from the loads and contamination of the outside airstream by an aeroshell 108, of approximately spherical shape, and advantageoulsy constructed of light-weight carbon-fiber. This aeroshell 108 is articulated in two axes (azimuth, elevation) relative to the sensor's mounting base (not shown) using electromechanical servo motors (not shown), precision stabilized to under 1-1.5 microradians using high-resolution angle sensors (not shown) on each axis.

To achieve stabilization, an outer gimbal 124 and inner gimbal 125 are used in concert. The mirror system 126 and all optical components are advantageously assembled as part of a rigid structure, gimbaled in two axes relative to the aeroshell 108 by electromechanical torque motors, and guided by one or more high-precision (under 0.01-0.02 degrees/hour bias drift) inertial sensors 123. The components coupled to the inner gimbal 125 are mass balanced to place their collective center of gravity substantially at the gimbal center of rotation (preferably within a 2 mm sphere of the center of rotation), thus minimizing inertial mixing of translational vibrations into rotational vibration. The inner gimbal 125 is precision stabilized to within 2 microadians of a desired orientation.

The ISR system 100 uses a high-power pulsed ultraviolet laser 121 to illuminate the target. One preferred implementation uses a frequency-tripled Nd:YAG laser to generate 8-12 or 9-11 Joule pulses of 1.5-2.5 ns duration at 0.330-0.380 or 0.350-0.360 micrometer wavelength. The ISR system 100 uses its main mirror system 126 to focus the illuminating pulse 150 on a specific spot size at the target. The number of photons collected by the aperture 172 to form each pixel of the returned image depends on the size of the sensor aperture 172, the range to target, efficiency of the receive optics, the pixel-density of the desired image, and the power density of the illumination on target. The illuminating power density depends on the spot size, the efficiency of the output optics, and the energy of the pulse leaving the laser.

The relationship between illumination power, target range, and image characteristics is described by the relation:

$$\frac{T_{rx}T_{tx}P_{avg}\lambda D^2}{8n_{photon-req'd}Fhcr_{target}^2} \geq 1,$$

where $T_{rx} = T_{atmos}T_{window}T_{mirror-sys}T_A T_B T_{filt}$ is the optical transmission coefficient of the pulse return path from the target to the sensor, and $T_{tx} = T_{C'}T_{B'}T_A T_{mirror-sys}T_{window}T_{atmos}$ is the optical transmission coefficient of the outgoing pulse from the laser to the target, where $T_{atmos}$ is the transmission coefficient of the atmosphere between the sensor and target, $T_{window}$, $T_{mirror-sys}$, $T_A$, $T_B$, $T_{B'}$, $T_{C'}$ are the optical transmission coefficients of the various optical elements, and $P_{avg}$ is the time-averaged output power of the laser, D is the diameter of the sensor's primary aperture, $\lambda$ is the wavelength of the illumination light, $n_{photon-req'd}$ is the number of photons required by each pixel of the focal-plane sensor in order to form an acceptable image, F is the frame rate, h is Planck's constant, c is the speed of light, and $r_{target}$ is the range to the target.

A UV image sensor 109 sits behind a narrow band (0.008-0.012 or 0.009-0.011 micrometer full width at half maximum intensity or FWHM filter centered at 0.330-0.380 or 0.350-0.360 micrometer wavelength) bandpass filter 113 that substantially eliminates all light 146 coming into the sensor 109 except reflected laser light 150 from the illuminator 121. Such a filter would allow at least 90% of light at a desired wavelength range. The UV sensor 109 itself could be any suitable sensor, for example a 2000×2000 pixel back-illuminated monochrome CCD, with quantum efficiency enhanced toward the ultraviolet side of its sensitivity. Only a small portion of the UV sensor 109 will receive the UV-illuminated image, with image location dependent on spot-steering described below. The UV CCD sensor's output can advantageously be selected to have an at least 5 MHz bandwidth, allowing a 300×300 image to be read out at up to frame rates of at least 30 fps. The visible-light detector 115 could be any suitable sensor, including, for example, a 2000×2000 pixel front-illuminated interline CCD with multiple output modes. Images collected from both focal plane sensors are fed into an image processor, where electronic stabilization is accomplished. Both sensors are advantageously selected to have a resolution of at least 3, 4, 5, or even 6 megapixels.

In the arrangement shown in FIG. 1, the optical system behind the primary mirror 127 is responsible for several aspects of sensor operation: zoom and focus of images on the focal plane sensors, optical correction of atmospheric image distortions, control of the size and position of the laser spot projected on the target. This system includes lens A 116, Mirror 131, Lens B' 119, Lens C' 118, a steerable mirror 117, a preferably deformable mirror 110, a lens 111, and a movable mirror 112 mounted in a rotation stage 114.

The lenses 111, 116, 118, 119 are made of materials suitable for the wavelengths used. For the preferred ultraviolet and visible-light system, lenses are advantageously precision-ground from BK7 glass or other borosilicate crown glasses, or UV fused silica. Lens A 116, Lens B 111, and Lens B' 119 are moveable about at least one axis under command of a control computer 122. Lens A 116 and Lens B 119 form the primary zoom and focus system for the focal plane sensors 109, 115. Lens A 116 and lens B' 119 form the focus system for control of the illumination spot size at the target. Lens C' 118 is preferably fixed and spreads the illumination beam before entering the output system of lens B' 119 and lens A 116.

Control of the beam location painted on the target is at least partially determined by the angle of the steering mirror 117 located between the output of laser 121 and lens C' 118.

The ISR system 100 is advantageously generally carried by an aircraft flying through the atmosphere. The shape of the aircraft and outer surface of the aeroshell cause atmospheric disturbances as the pass through the air, which results in perturbation of the air's index of refraction, causing image distortion. A large fraction of this image distortion is predictable based on known aerodynamic and physical factors, and can be optically corrected using the deformable mirror, operating under computer control. This deformable mirror 110 is contemplated to be similar to the adaptive wavefront correction mirrors commonly used in professional astronomical research telescopes to compensate for image distortion resulting from atmospheric turbulence.

Contemplated focal lengths for this primary optical system are typically in the range of 1 to 30 meters, 2 to 20 meters, or 8 to 18 meters. The primary mirror system 126 may be configured to have a focal length in the range of 1 to 5 meters.

Method aspects of the present inventive subject matter are also contemplated. In such methods, potential targets may be detected with a lower resolution, wider angle system that uses passive (natural or self) illumination. This process could subsequently and automatically be entered into a target queue, and cause the higher magnification, high resolution, artificially illuminated system to seek out said target and illuminate and observe the target to provide functions of identification and confirmation. It is contemplated that these steps could be carried out by onboard systems without human intervention, with only the high resolution target imagery being transferred to an offboard operator or analyst. In such methods, preferred ISR systems can function as narrow field of view high resolution identification systems. The secondary system, which may function to detect and queue the primary system, may operate from the same gimbal, but may have a different aperture, different imaging sensors, and different sensitivities to electromagnetic radiation.

Figure 2:
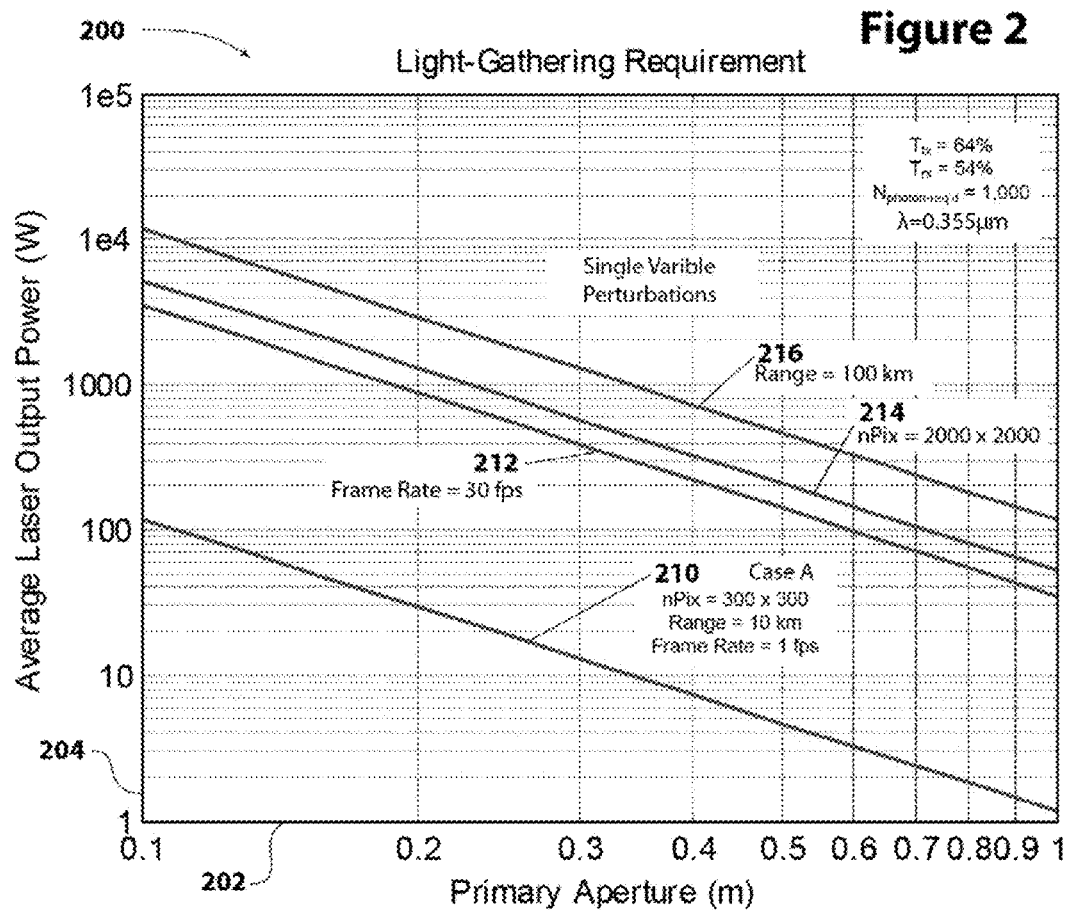
FIG. 2 is a plot depicting the relationships governing the light gathering requirements of surveillance and reconnaissance system.

FIG. 2 is a plot illustrating the viability of contemplated systems as described herein, for target distances between 10 and 100 km. Contemplated target distances range between 5 and 100 km or even more. The plot 200 depicts the relationships governing the light gathering requirements of an ISR system 100. The horizontal axis 202 is the system 100 primary aperture 172 in meters, while the vertical axis 204 is the output power of the illuminating laser 121. A first relationship 210 shows that about 10 Watts of output power are needed if the aperture is about 0.34 meters. The baseline case corresponds to a 300×300 pixel image area on the sensor, with a range from the target to the system of 10 kilometers, and a frame rate of one frame per second.

Several single variable perturbations from this first exemplary case are displayed as relationships 212, 214, and 216. For all relationships 210, 212, 214, and 216 in this exemplary calculation, it is assumed that the optical transmission coefficient of the pulse return path from the target to the sensor ($T_{rx}$) is 54%, and the optical transmission coefficient of the outgoing pulse from the laser to the target ($T_{tx}$) is 64%, that 1000 photons per detector pixel are required, and that the light wavelength is an especially preferred value of 355 micrometers. Relationship 212 shows the increase in laser output power or aperture required to image if a frame rate of 30 frames per second is required. Relationship 214 shows the effect on power and aperture if filling all 2000× 2000 pixels of an exemplary sensor is required. Relationship 216 shows the effect if operating at a range of 100 kilometers is required.

FIG. 3 is a schematic illustration of the ISR system 100 employed on an unmanned aircraft 300, flying at an altitude 304 over the ground 306. The system 100 is oriented such that the illumination pulse 310 from the laser 121 strikes a target 320 at a distance 322 from the ISR system 100. The illumination pulse 310 is reflected off the target 320 and back at the ISR system 100 following a return light path 324 so that it can be recorded on the sensor 109.

It is contemplated that especially preferred systems would have sufficient power and aperture to image on the order of 1 centimeter resolution from target distances of at least 6, 8, 10, 12, 16, 20, 24, 40, 60, 80 or even 100 kilometers. Especially preferred aircraft 300 would be of sufficient size to carry a relatively heavy large aperture ISR system 100. Preferred aircraft 300 is sized and dimensioned to fly at altitudes of at least 15, 20, 25, 30, 35, or 40 thousand feet.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An aerial surveillance and reconnaissance system, comprising:
   a primary optical system having a primary mirror disposed to collect incoming light passing through a primary aperture, a secondary mirror disposed to receive the reflected light from the primary mirror, and a secondary aperture in the primary mirror;
   a secondary optical system comprising:
      a movable mirror having a first position and a second position, wherein the first position is configured to direct inbound light received from the secondary mirror to a first detector having sensitivity to ultraviolet light, and positioned functionally behind an ultraviolet bandpass filter, wherein the second position is configured to direct inbound light received from the secondary mirror to a second detector having sensitivity to visible light, and wherein the movable mirror is configured to transition between the first position and the second position when commanded;
      a deformable mirror functionally disposed between the secondary aperture and the movable mirror, wherein the deformable mirror is configured to provide optical correction under computer control, and wherein the computer control is based on a predictive algorithm utilizing atmospheric factors; and
   an ultraviolet laser illumination system capable of sending laser illumination out through the secondary aperture.

2. The system of claim 1, wherein the secondary aperture is disposed in the primary mirror, and the secondary aperture is smaller than the primary aperture.

3. The system of claim 2, where the primary optical system is mounted on a gimbal stabilization system, and the second optical system is mounted to the same gimbal stabilization system.

4. The system of claim 1, where the primary aperture is at least 400 mm in diameter.

5. The system of claim 1, further comprising a laser illuminator, and a steerable mirror that directs outbound laser light from the laser illuminator through the secondary aperture.

6. The system of claim 1, where the ultraviolet laser illumination system produces output having a wavelength of at between 0.330 and 0.380 micrometers.

7. The system of claim 1, where the bandpass filter passes at least 90% of light at a center wavelength between 0.350 and 0.360 micrometers, with a band width of between 0.008 and 0.012 micrometers.

8. The system of claim 1, further comprising a mirror positioned to pass both the inbound light and the outbound laser illumination.

\* \* \* \* \*